Figure 1:
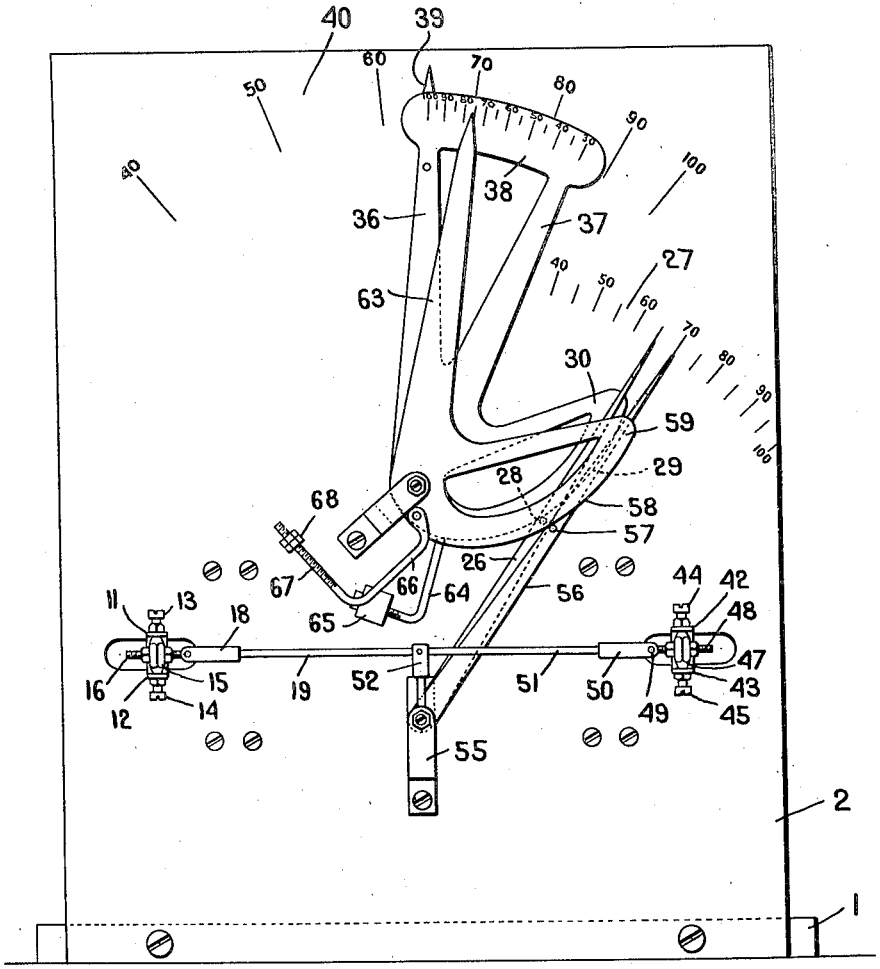

Dec. 11, 1923.

E. W. COMFORT 1,476,799

AUTOMATIC INDICATOR OF WET AND DRY BULB TEMPERATURE AND RELATIVE HUMIDITY

Filed July 22, 1919     5 Sheets-Sheet 1

Inventor.
Edward W. Comfort
by Heard Smith & Tennant.
Attys.

Dec. 11, 1923.
E. W. COMFORT
1,476,799
AUTOMATIC INDICATOR OF WET AND DRY BULB TEMPERATURE AND RELATIVE HUMIDITY
Filed July 22, 1919
5 Sheets-Sheet 5

Inventor.
Edward W. Comfort
by Heard Smith & Tennant
Attys.

Patented Dec. 11, 1923.

1,476,799

UNITED STATES PATENT OFFICE.

EDWARD W. COMFORT, OF WINCHESTER, MASSACHUSETTS, ASSIGNOR TO PARKS-CRAMER COMPANY, OF FITCHBURG, MASSACHUSETTS, A CORPORATION OF MASSACHUSETTS.

AUTOMATIC INDICATOR OF WET AND DRY BULB TEMPERATURE AND RELATIVE HUMIDITY.

Application filed July 22, 1919. Serial No. 312,543.

*To all whom it may concern:*

Be it known that I, EDWARD W. COMFORT, a citizen of the United States, and resident of Winchester, county of Middlesex, State of Massachusetts, have invented an Improvement in Automatic Indicators of Wet and Dry Bulb Temperature and Relative Humidity, of which the following description, in connection with the accompanying drawing, is a specification, like characters on the drawing representing like parts.

This invention relates to improvements in instruments for indicating or recording conditions of the air which are functions of the wet and dry bulb temperatures of the air.

It also contemplates means for constantly recording on a moving dial or tape the atmospheric conditions thus indicated. All of the hitherto well known and reliable means of ascertaining humidity require careful and accurate observation of the so-called wet and dry bulb temperatures as indicated by thermometers. These readings having been secured it is the common practice to refer to charts such as the well known "Lloyd's hygrodeik" or to consult tables such as those published by the United States Weather Bureau and from these tables to determine the relative humidity and actual humidity.

Various devices have also been designed to compute the humidity from the wet and dry bulb temperatures of the air which are in reality nothing more than mechanical means of utilizing empirically designed charts. An illustrative mechanism of this character is disclosed in Patent No. 1,003,341, Comfort, granted September 12, 1911.

So-called hygrometers actuated by the varying tension of hair, textile fibrous strands and the like have also been commonly used but are known to be inaccurate.

This invention comprises an improvement over all of these methods in that it eliminates altogether the necessity for reading thermometers and for consulting tables or charts. It derives its action from thermo-expansible elements exposed to the dry and psychrometric wet bulb temperatures of the air and hence is accurately actuated, the expansion of these elements, being translated by suitable means into a motion of a pointer over a graduated dial or tape, serves to make the condition of the air or of the materials affected by the air directly readable thereby saving time and insuring accuracy.

It is a well known fact that the condition or property of the atmosphere known as relative humidity is a mathematical function of the wet and dry bulb temperatures and the law which defines this relation may be empirically expressed by the following formula.

$$\frac{Tw-4}{Td-4} = Ch$$

in which, $Tw$ is the psychrometric wet bulb temperature in degrees Fahrenheit.

$Td$ is the dry bulb temperature in degrees Fahrenheit.

$Ch$ is a constant for any given relative humidity.

From the above equation the following equation may be derived:

$$\text{Log.}(Tw-4) - \text{log.}(Td-4) = \text{log.}Ch.$$

By utilizing the principle of the ordinary Mannheim slide rule it is possible to design a special slide rule on which one set of graduations corresponds to logarithms of temperature less 4, in each case, and the second set of graduations corresponds to logarithms of the different values of the constant $Ch$. By means of such a slide rule properly designed and graduated it becomes possible with any two conditions known, such as wet and dry bulb temperatures, to so dispose the slides that a third condition such as relative humidity, which is a function of the two known conditions, is directly indicated.

The principle upon which the present device depends is identical with that of the slide rule described, the application being made by the use of mechanism so constructed that the motion of a follower moved by a driver, such as a cam, will bear the proper logarithmic relation to the motion of the thermometric members which actuate the follower.

In a simplified form of the invention a thermometric wet bulb member actuates a cam which in turn causes a graduated segment to swing upon the axis of the cam, the angular movements of the segment being in logarithmic relation to the motion of a thermostatic actuating member. A pointer attached to a second cam on the same axis as the first derives its motion from the movement of a second thermometric member influenced by the dry bulb temperature of the air and bears a like logarithmic relation to it. The pointer, therefore, which swings on the same arc as the graduated segment, indicates the relative humidity by its position relative to the graduations on the segment and their corresponding notations or numerical values. By a similar method any property either of the atmosphere or of the hydroscopic condition of material exposed to the atmosphere, which is known to be a function of the wet and dry bulb temperatures only and to vary in accordance with the predetermined law or empirical formula, may be indicated. All of these properties are in fact mathematical functions of the wet and dry bulb temperatures of the air.

Such a property is the so-called "regain" of cotton. By the similar use of cams designed to produce the proper logarithmic motions the scale may be so graduated that the pointer will indicate on it that value of regain which corresponds to the actuating wet and dry bulb temperature of the atmosphere to which the cotton is subjected.

A further feature of the invention contemplates providing means for recording the condition of the atmosphere above mentioned. To adapt the instrument for such recording purpose it is only necessary to cause a recording pen or other suitable recording means to move with relation to indicating arcs on the recording dial or with relation to parallel lines on a moving tape which may be actuated by clockwork mechanism in accordance with the well known practice in the art.

A modification however of the construction above indicated is required in order that the scale may be supported in a fixed position while the recording means is caused by the action of the thermo expansible members to pass over it.

Figure 2:
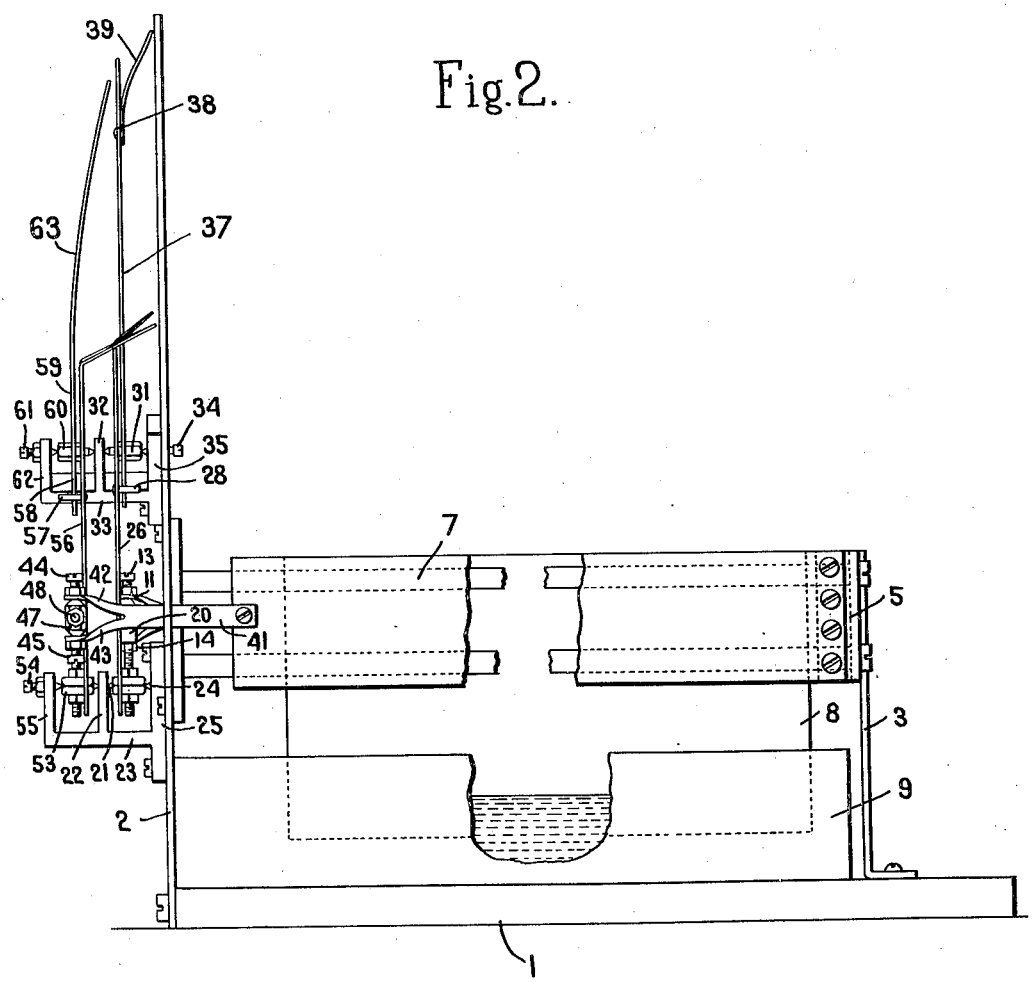
Figure 3:
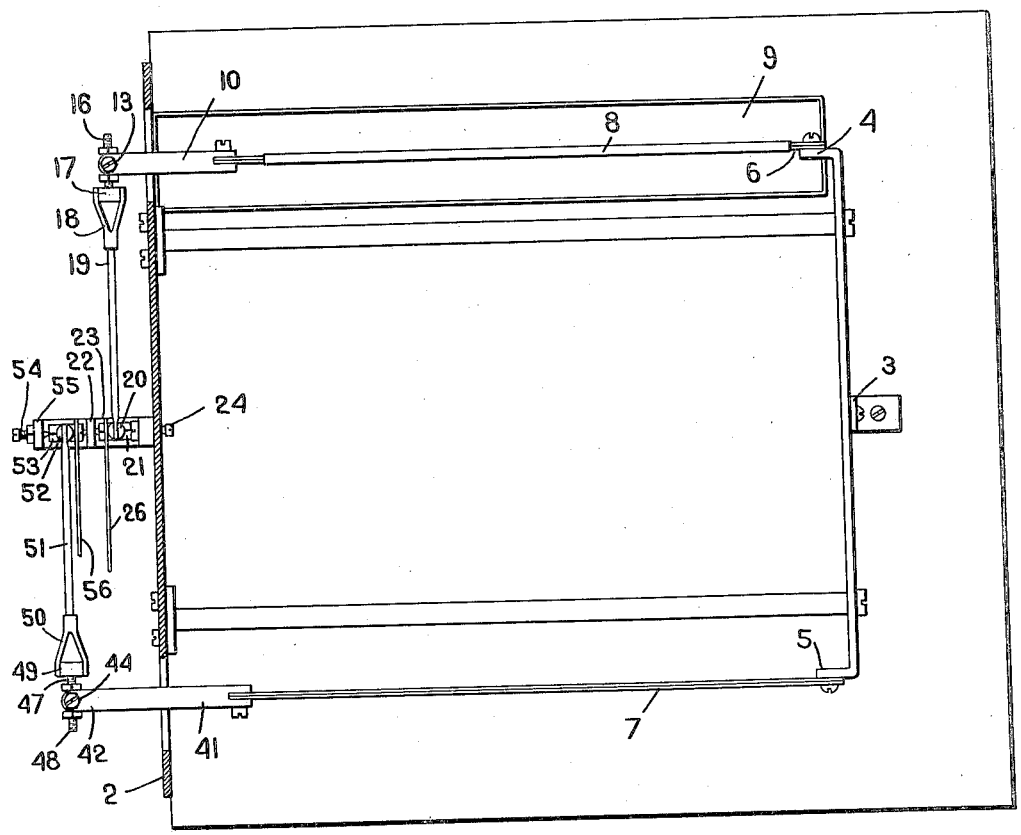
Figure 4:
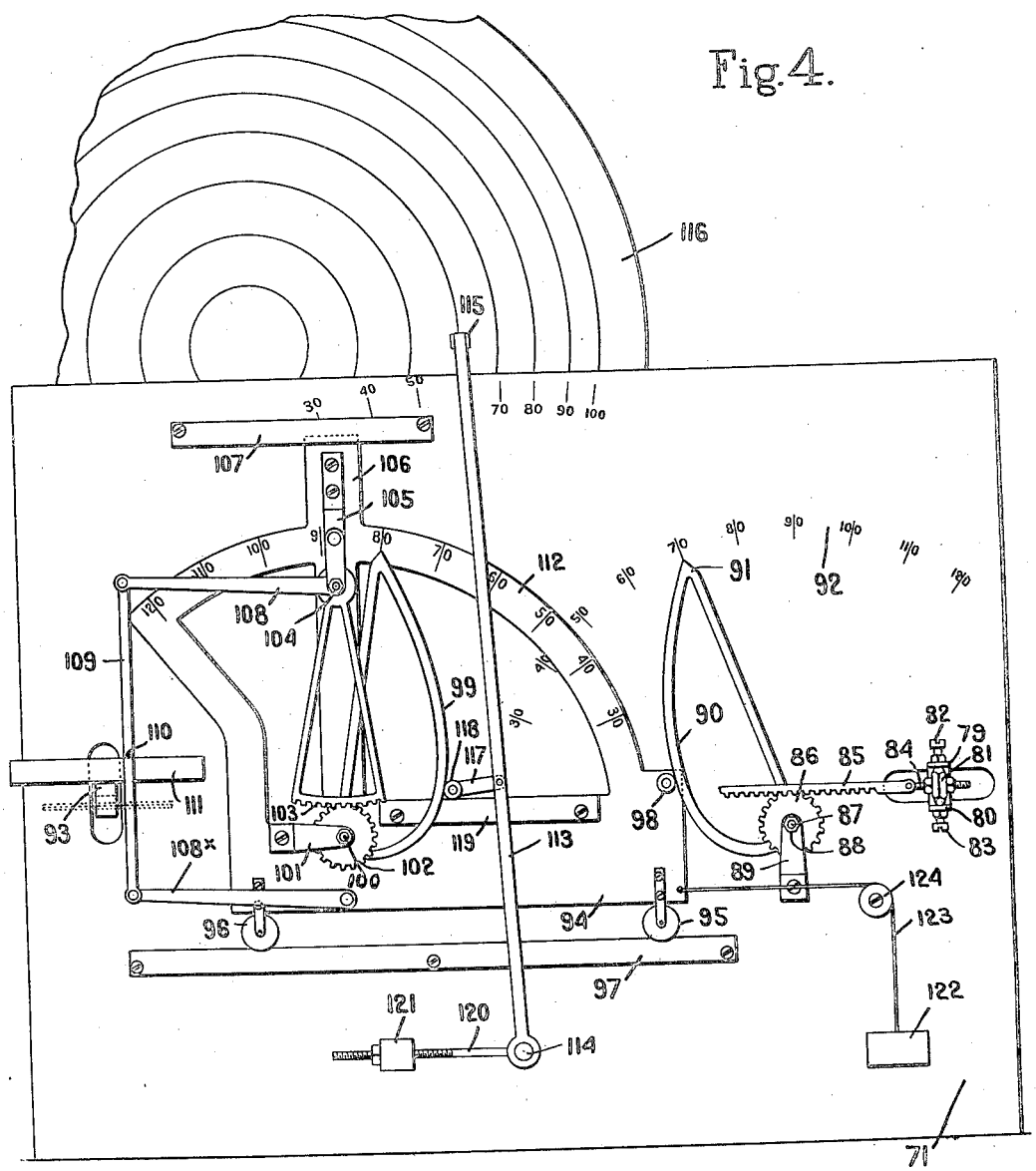
Figure 5:
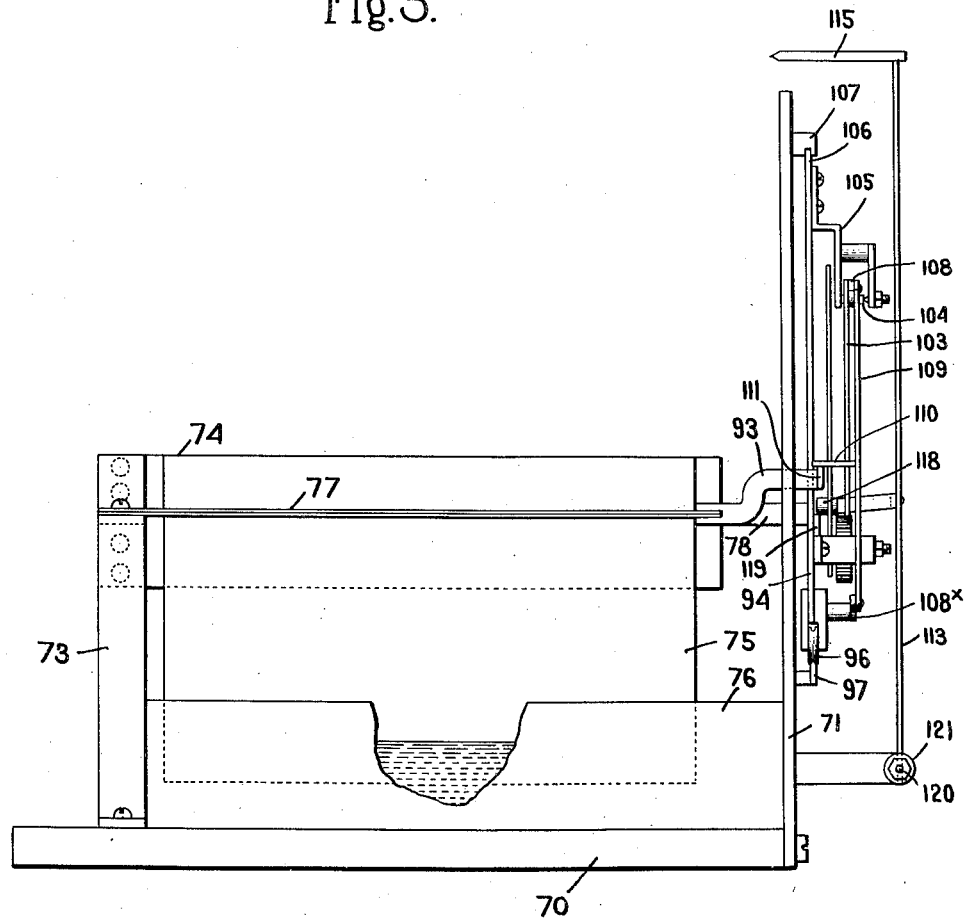

Preferred embodiments of the invention are illustrated in the accompanying drawings in which, Fig. 1 is a front elevation of a preferred device for indicating relative humidity or other conditions which are dependent upon the function of the wet and dry bulb temperatures of the air, Fig. 2 is a side elevation, and, Fig. 3 is a plan view of the same, Fig. 4 is a front elevation of a modified form of the invention which is adapted to indicate the wet and dry bulb temperatures of the air and to record any condition which is a function of said wet and dry bulb temperatures, and, Fig. 5 is a side elevation of the same.

The indicating device illustrated in Figs. 1 to 3 inclusive comprises a base 1 and a front plate 2 which supports the indicating mechanism. At or adjacent the rear end of the base 1 a bracket 3 is provided which desirably has flanges 4 and 5 to which the thermo-expansible members 6 and 7 are rigidly secured, and which are exposed respectively to the wet and dry bulb temperatures of the air. These thermo-expansible members as illustrated herein desirably are of bi-metallic construction, being formed of two plates of different metals having different co-efficients of expansion such as brass and "invar steel" welded together throughout their length whereby the unequal expansion of said metals under varying temperature conditions will cause a bending of said members.

One of these members, which is to be subject to the wet bulb temperature of the air, which will be referred to as the "wet bulb member," may be provided with a mantle 8 of suitable fabric which dips into water contained in a suitable tank 9 resting upon the base 1 beneath said expansible member, or it may be subjected to the influence of a vaporizing spray of water which will reduce its temperature to the psychometric wet bulb temperature of the air. The other member, which will be referred to as the dry bulb expansible member, is uncovered.

The wet bulb member 8 is provided at its free end with an extension 10 which projects through the front plate 2 and is bifurcated at its outer end, the arms 11 and 12 of said bifurcation being connected by conical pivotal screws 13 and 14 to a post 15 having a central traverse screw threaded aperture in which a rod 16 is adjustably mounted, said rod 16 having at its end a head 17 which is pivotally connectetd to the bifurcated end 18 of a link 19 which is connectetd at its opposite end to a vertical arm 20 of a shaft 21 having one conical end seated in a boss 22 extending upwardly from a bracket 23 which is carried by the front plate 2.

The opposite end of the shaft 21 is provided with a conical socket which is engaged by the conical end of a screw 24 which passes through the base 25 of the bracket and the front plate 2 by which said bracket is carried. A movable member 26 is rigidly connected to the shaft 21 preferably by a nut upon the screw threaded portion of the shaft 21. The movable member 26 preferably is in the form of a pointer which co-operates with a scale 27 to indicate the temperature to which the expansible member is subjected.

The movable member or pointer 26 is provided with a stud 28 which engages the face 29 of a logarithmic cam 30 the curvature of which is computed and designed in accordance with the formula above given. The base of the logarithmic cam 30 is provided with a screw threaded and conically pointed shaft the pointed end of which engages a boss 32 upon a bracket 33 carried by the front plate 2. The opposite end of the shaft 31 is provided with a conical socket which is engaged by the conical end of a screw 34 which is seated in the base 35 of the bracket 33 which is secured to the front plate 2.

The cam 30 is connected to or preferably formed integral with a movable member carrying a scale having graduations indicating a condition of the air which is a function of the wet and dry bulb members. As disclosed herein the extension comprises a skeleton structure having arms 36 and 37 carrying at their upper ends an integral segmental scale 38 provided with graduations which as shown herein are designed to indicate the relative humidity of the air.

An index finger 39 secured to the outer end of the arm 36 co-operates with a scale 40 which conveniently may be made upon the front plate 2 to indicate the wet bulb temperature of the air.

The dry bulb expansible member 7 of the instrument likewise has at its free end an extension 41, the bifurcated ends 42 and 43 of which are connected by conical pivoted screws 44 and 45 to a post 47 having a central transverse screw threaded aperture in which a screw threaded rod 48 is adjustably mounted, said rod having at its end a head 49 which is pivotally connected to the bifrucated end 50 of a link 51 which is connected at its opposite end to a vertical arm 52 of a screw threaded and conically pointed shaft 53 having one end seated in the boss 22 of the bracket 23. The opposite end of the shaft 53 is provided with a conical socket which is engaged by the conical end of a screw 54 which passes through a boss 55 extending upwardly from the end of the bracket 23.

A movable member or actuator 56 is rigidly secured to the shaft 53 preferably by a nut upon a screw threaded portion of the shaft 53 and desirably is in the form of a pointer adapted also to co-operate with the scale 27 to indicate the temperature of the dry bulb expansible member. The movable member or pointer 56 is provided with a stud 57 or driver which engages the face 58 of a longarithmic cam upon a follower 59 which is rigidly secured to a shaft 60 having one conical end mounted in a conical recess in the boss 32 of the bracket 33. The other end of the shaft 60 has a conical socket engaged by the conical end of a screw 61 seated in a boss 62 in the bracket 33.

The axes of the shafts 21 and 53 desirably are in alinement as are also the axes of the shafts 31 and 60. The cam 59 is connected to or preferably integral with a movable member desirably in the form of a pointer 63 which co-operates with graduations upon the segmental scale 38 to indicate the relative humidity or such other condition as may be indicated by the graduations of the scale.

In order to insure delicacy in operation counterbalancing means are provided for the cams and the movable members which are connected to or made integral with said cams. A convenient counterbalancing means for the cam 30 comprises an L-shaped arm 64 having a weight 65 desirably mounted on its screw-threaded free end portion. The cam 59 likewise is provided with an L-shaped arm 66, the free end 67 of which is screw threaded and provided with an adjustable weight or weights 68 which may be in the form of a pair of nuts.

In the operation of the indicating device above described the expansion or contraction of the wet bulb member due to variations in temperature causes a bending of the plate 6 which actuates the link 19 to rock the vertical arm 20, thus moving the movable member or pointer 26 over the arc 27.

The stud 28 which engages the face 29 of the cam 30 thereupon transmits to the movable member comprising the arms 36, 37 a movement which corresponds to the logarithmic function of the wet bulb temperature, the character of this movement being indicated upon the scale 40 by the pointer 39.

In a similar manner changes in the dry bulb temperature of the air cause a flexing of the dry bulb member 7 which actuates the link 51 to rock the vertical arm 52 upon its pivot thereby actuating the movable member or pointer 56 so that it indicates the dry bulb temperature upon the scale 27. The stud 57 which is carried by the member 56 and engages the face 58 of the logarithmic cam 59 actuates said cam thereby causing the pointer 63 to move over the graduations upon the segmental scale 38 thus indicating a condition of the air which is dependent upon the function of the wet and dry bulb temperatures, which as illustrated is the relative humidity of the atmosphere.

In Figs. 4 and 5 another preferred embodiment of my invention is illustrated which is adapted not only to indicate a condition dependent upon the function of the wet and dry blub temperatures but also to record the same.

The embodiment of the invention disclosed in Figs. 4 and 5 like that disclosed in the preceding figures comprises a base 70 having a front plate 71 secured thereto upon which the various movable members of the indicating, recording and regulating mechanisms are mounted. A bracket 73 which extends upwardly from the rear portion of the base 70 supports the wet and dry bulb members, the wet bulb member 74 being secured to it in a vertical position and having a mantle 75 which extends into water in a tank 76 resting upon the base 70. The dry bulb member 77 is secured to the bracket 73 in a horizontal position. The wet bulb member 74 is provided with an extension 78 which extends through a slot in the front plate 71 and is provided with a bifurcated end, the arms 79 and 80 of which are pivotally connected to a post 81 by screws 82 and 83 having conical points entering conical recesses in the ends of said post. The post 81 is provided with a transverse screw threaded aperture in which a rod 84 is adjustably secured by suitable nuts. The rod 84 is pivotally connected to the end of a rack 85 the teeth of which engage the teeth of a pinion 86 which is provided with a shaft 87 which is screw threaded at one end and provided with a conical point which engages a complementary socket in the plate 71 or other suitable bearing provided for such purpose. The opposite end of the shaft 87 is engaged by the conical end of a screw 88 which is carried by a bracket 89 secured to the front plate 71.

A logarithmic cam 90 desirably may be fixedly secured upon the shaft 87 by a clamping nut upon the screw threaded portion of the latter. The logarithmic cam 90 engages and is adapted to operate a movable member which carries a logarithmic cam operable by the dry bulb member which in turn engages and operates a differentially movable device or indicator which serves to indicate and preferably to record a condition of the air which is dependent upon the function of the wet and dry bulb temperatures, the movable indicating member being actuated by conjoint movement of the logarithmic cams which are actuated respectively by the wet and dry bulb members.

The logarithmic cam may be formed to present an acute angled end 91 forming a pointer adapted to co-operate with a scale 92 upon said face plate 71 to indicate the wet bulb temperature of the air.

The dry bulb member 77 is provided at its free end with an extension 93 which is offset vertically and which projects through a suitable slot in the front plate 71. Means are provided whereby the free end of the dry bulb member will actuate a logarithmic cam which is mounted upon a carriage which is movable by the logarithmic cam that is operated by the wet bulb member. Any suitable means may be provided for supporting the carriage in such a manner that the conjoint movement of the logarithmic cams will operate the recording device to give it proper differential movement to indicate and record the condition of the air which is a function of the wet and dry bulb members.

In the preferred construction illustrated herein the carriage 94 is in the form of a skeletonized plate supported by rollers 95, 96 upon a preferably horizontal bracket 97 which is secured to the front plate 71.

The carriage 94 is provided at one end with a roller 98 which is mounted upon a suitable stud and engages the surface of the logarithmic cam 90 so that the rotation of the cam will impart a sliding movement to the carriage from the action of the expansion of the wet bulb member. In this construction the cam acts as a driver upon the roller or follower, which is the converse of the construction shown in Fig. 1. The logarithmic cam 99 which is operated by the dry bulb member is mounted in a manner similar to the cam 90 upon a shaft having at one end a conical bearing in the carriage 94 and at the opposite end a socket engaged by the screw 100 carried by a bracket 101 secured to said carriage. A gear 102 fixedly secured upon the cam shaft is engaged by the teeth of a sector 103 which is pivotally mounted upon the shaft 104 carried by a bracket 105 secured to an upward extension 106 of the carriage 94. The extension 106 of the carriage enters a guiding groove in a block 107 which is secured to the front plate 71 and serves to support the carriage in vertical position. The shaft 104 is provided with a substantially horizontal arm 108 to the free end of which a vertical link 109 is pivotally mounted, the lower end of said link being connected to an arm 108˟ which is parallel to the link 108. The link 109 is provided with a pin 110 which engages the horizontal face of a bar 111 which is carried by the outer end of the extension 93 of the dry bulb member. By reason of this construction the vertical movement caused by the expansion of the horizontal dry bulb expansible member will raise the link 109 through the pin 110 thereby raising the free end of the arm 108 and oscillating the toothed sector 103, thus rotating the gear 102 and consequently the logarithmic cam 99. The carriage 94 may conveniently be provided with a sector 112 provided with graduations adapted to indicate the dry bulb temperature of the atmosphere.

The logarithmic cam 99 may be arranged to impart the differential movement caused by the conjoint action of the cams 90 and 99 to a movable indicating and recording member adapted to co-operate with a suitable rotatable dial or traveling tape graduated to indicate the condition of the air or materials which is a function of the wet and dry bulb temperatures. A convenient device which is illustrated herein comprises an arm 113 supported at its lower end upon a pivot 114, which preferably is a stud mounted in the front plate 71 and provided at its upper end with a pen 115 which rests upon a dial 116 which may be suitably supported from the front plate 71 and rotated by clockwork in a usual and well known manner.

A link 117 which is pivotally secured to the arm 113 is provided at its free end with a roller 118 which rests upon a track 119 secured to said carriage, said roller 118 also engaging the face of the logarithmic cam 99. In order to maintain the roller 118 constantly in engagement with the face of the cam 99 counterweighting means are provided for the arm 113 which desirably is in the form of a screw threaded arm 120 which is connected to or integral with the arm 113.

The roller 98 may be maintained constantly in contact with the face of the logarithmic cam 90 in any suitable manner, a convenient means which is shown herein comprising a weight 122 connected to the end of the carriage 94 by a cord 123 running over a suitable guide pulley 124. Or if desired the track 97 may be slightly inclined so that the weight of the carriage will tend to cause the same to travel downwardly on said track and maintain the roller 98 in contact with the face of the logarithmic cam 90, the bar 111 being similarly inclined.

In the operation of the machine the logarithmic cam 90 which is actuated by the wet bulb member forces the carriage 94 along the track 97 in accordance with the movement of the expansible wet bulb member under varying conditions of temperature while the logarithmic cam 99 is similarly actuated by the expansion of the dry bulb member under varying temperature conditions. The connection between the dry bulb member and the cam 99 above described is such that the proper actuation of cam 99 is effected notwithstanding the sliding movement of the carriage upon which said cam is mounted.

The cam 99 therefore imparts a differential movement to the arm 113 which is a resultant of the movements of the logarithmic cams, thus the arm 113 which carries the pen 115 may be caused to scribe upon the continuously moving dial 116 a line which represents a condition which is a function of the wet and dry bulb temperatures of the air, such as relative humidity, or cotton regain, etc., dependent upon the character of the logarithmic cams aforesaid.

It will be understood that the embodiments of the invention disclosed herein are of an illustrative character and are not restrictive and that other mechanisms for accomplishing the same or a similar purpose may be employed within the meaning and scope of the following claims. Various other mechanisms may also be employed for translating the movement of the expansible member into the proper logarithmic motion.

Having thus described my invention what I claim as new and desire to secure by Letters Patent is:

1. A psychrometric device comprising wet and dry bulb expansible members, co-operating movable indicating members and means simultaneously operable respectively by said wet and dry bulb expansible members for transmitting motion to said co-operating movable members in logarithmic relation to the respective temperatures of said expansible members whereby the relative positions of said movable members are indicative of a condition of humidity which is a function of the temperatures of said wet and dry bulb members.

2. A psychrometric device comprising wet and dry bulb expansible members, movable members and means simultaneously operable respectively by said wet and dry bulb expansible members for transmitting motion to said movable members in logarithmic relation to the respective temperatures of said expansible members and means operable by the differential movement of said movable members for indicating a condition which is a function of the temperatures of said wet and dry bulb expansible members.

3. A psychrometric device comprising wet and dry bulb expansible members, movable members and means simultaneously operable respectively by said wet and dry bulb expansible members for transmitting motion to said movable members in logarithmic relation to the respective temperatures of said expansible members and means operable by the differential movement of said movable members for indicating and for recording a condition which is a function of the wet and dry bulb temperatures of said expansible members.

4. A psychrometric device comprising two thermo-expansible members subject respectively to the influence of the wet and dry bulb temperatures of the air, mechanisms operable thereby each including a driver and a follower having engaging means for correlating the motions of each follower to those of its driver in predetermined logarithmic relation, indicating means including a graduated scale and a co-operating pointer actuated by the differential motion of said followers to indicate a condition of humidity which is a function of the wet and dry bulb temperatures of the air.

5. A psychrometric device comprising wet and dry bulb expansible members, means including pointers actuated by said respective members, dials co-operating with said pointers indicating respectively the wet and dry bulb temperatures of the air, logarithmic cams movable by said indicating means and differential means operable by said cams for indicating a condition of humidity which is a function of the wet and dry bulb temperatures of the air.

6. A psychrometric device comprising wet and dry bulb expansible members, means including pointers, respectively actuated by the expansion of said members, dials co-operating with said pointers indicating respectively the wet and dry bulb temperatures of the air, logarithmic cams movable respectively by said indicating means, a recording index differentially actuated by said cams and a continuously rotating dial co-operating with said index for continuously recording a function of the wet and dry bulb temperatures of the air.

7. A psychrometric device comprising wet and dry bulb thermo-expansible members, pivotally mounted members actuated thereby, logarithmic cams operable respectively by the movements of said pivotally mounted members and co-operating differential indicating means actuated by the movements imparted by said cams to indicate a condition of humidity which is a function of the wet and dry bulb temperatures of the air.

8. A psychrometric device comprising a wet bulb thermo-expansible member, a pivotally mounted logarithmic cam, means operable by the movement of said wet bulb member for actuating said cam, a carriage movable by said logarithmic cam, a second logarithmic cam pivotally mounted upon said carriage, a dry bulb thermo-expansible member, means actuated thereby for rotating said second logarithmic cam and means actuated by the conjoint motion of said carriage and said second logarithmic cam for indicating a condition which is a function of the wet and dry bulb temperatures of the air.

9. A psychrometric device comprising a wet bulb thermo-expansible member, a pivotally mounted logarithmic cam, means operable by the movement of said wet bulb member for actuating said cam, a carriage movable by said logarithmic cam, a second logarithmic cam pivotally mounted on said carriage, a dry bulb thermo-expansible member, means actuated thereby for rotating said second logarithmic cam independently of the movement of said carriage and means operable by said second logarithmic cam for indicating a condition which is a function of the wet and dry bulb temperatures of the air.

10. A device of the character described comprising two thermo-expansible members subject respectively to the wet and dry bulb temperatures of the air, mechanisms operable thereby including drivers and followers having engaging means for correlating the motions of each follower to its driver in predetermined logarithmic relation, means operable by said followers for indicating a condition which is a function of the wet and dry bulb temperatures of the air.

11. A psychrometric device comprising a wet bulb thermo-expansible member, a pivotally mounted logarithmic cam, means operable by the movement of said wet bulb member for actuating said cam, a carriage movable by said logarithmic cam, a second logarithmic cam pivotally mounted on said carriage, a dry bulb thermo-expansible member, means actuated thereby for rotating said second logarithmic cam independently of the movement of said carriage and means operable by the conjoint movement of said second logarithmic cam and said carriage for indicating a condition which is a function of the wet and dry bulb temperature of the air.

In testimony whereof, I have signed my name to this specification.

EDWARD W. COMFORT.